US011862011B2

(12) United States Patent
Shah et al.

(10) Patent No.: US 11,862,011 B2
(45) Date of Patent: *Jan. 2, 2024

(54) METHODS FOR ANALYZING VEHICLE TRAFFIC BETWEEN GEOGRAPHIC REGIONS

(71) Applicant: GEOTAB INC., Oakville (CA)

(72) Inventors: Shweta Pravinchandra Shah, Austin, TX (US); Daniel J. Lewis, Oakville (CA); Jean Pilon-Bignell, Ancaster (CA); Pooria Poorsarvi Tehrani, Toronto (CA); Chien An Liu, Mississauga (CA); Robert Bradley, Oakville (CA); Terence Michael Branch, Oakville (CA)

(73) Assignee: Geotab Inc., Oakville (CA)

( * ) Notice: Subject to any disclaimer, the term of this patent is extended or adjusted under 35 U.S.C. 154(b) by 242 days.

This patent is subject to a terminal disclaimer.

(21) Appl. No.: 17/375,150

(22) Filed: Jul. 14, 2021

(65) Prior Publication Data

US 2022/0383734 A1 Dec. 1, 2022

Related U.S. Application Data

(60) Provisional application No. 63/195,260, filed on Jun. 1, 2021.

(51) Int. Cl.
*G08G 1/01* (2006.01)

(52) U.S. Cl.
CPC ......... *G08G 1/0125* (2013.01); *G08G 1/0112* (2013.01)

(58) Field of Classification Search
None
See application file for complete search history.

(56) References Cited

U.S. PATENT DOCUMENTS 8,000,889 B2 8/2011 Jones
9,121,582 B2 9/2015 Brinkmann
9,141,582 B1 9/2015 Brinkmann et al.
9,940,654 B1 4/2018 Davies
10,217,069 B2 2/2019 Scicluna
(Continued)

FOREIGN PATENT DOCUMENTS

DE 102008017568 A1 4/2009
WO 2013131831 A2 9/2013

OTHER PUBLICATIONS

GPS Fleet Solutions <http://web.archive.org/web/20060111043/http://www.passivegps.com/pdf/CHECKmate%20Presentation-2.pdf> Archived Jan. 11, 2006. (Year: 2006).
(Continued)

*Primary Examiner* — James M McPherson
*Assistant Examiner* — Bakari Underwood
(74) *Attorney, Agent, or Firm* — Mark J. Pringle-Rigby

(57) ABSTRACT

A traffic analysis system analyzes location data from a plurality of vehicles to determine journeys made by the vehicles. Vehicles may make one or more rest stops during a journey. The traffic analysis system compares rest periods to journey criteria to determine whether a rest period delineates the end of a journey, or whether a rest period is still within the journey. In this way, a plurality of trips can be chained together into a journey to provide more accurate analysis of traffic patterns.

11 Claims, 6 Drawing Sheets

(56) References Cited

U.S. PATENT DOCUMENTS

| | | | |
|---|---|---|---|
| 11,124,154 B1 | 9/2021 | Bojinov | |
| 11,132,853 B1 | 9/2021 | Akhtar | |
| 11,335,143 B2 | 5/2022 | Kwak | |
| 11,527,153 B1 * | 12/2022 | Shah | G08G 1/0129 |
| 2002/0035421 A1 | 3/2002 | Warkentin | |
| 2002/0161517 A1 | 10/2002 | Yano | |
| 2005/0086063 A1 | 4/2005 | Silverbrook | |
| 2005/0125148 A1 | 6/2005 | Van Buer | |
| 2008/0077464 A1 | 3/2008 | Gottlieb | |
| 2008/0125958 A1 | 5/2008 | Boss | |
| 2009/0088962 A1 | 4/2009 | Jones | |
| 2009/0327011 A1 | 12/2009 | Petroff | |
| 2010/0235024 A1 | 9/2010 | Uchida | |
| 2011/0081922 A1 | 4/2011 | Chandra | |
| 2012/0066251 A1 | 3/2012 | Gontmakher | |
| 2012/0130636 A1 | 5/2012 | Westerlage | |
| 2012/0179319 A1 | 7/2012 | Gilman | |
| 2012/0290652 A1 | 11/2012 | Boskovic | |
| 2013/0297175 A1 | 11/2013 | Davidson | |
| 2013/0304347 A1 | 11/2013 | Davidson | |
| 2013/0304348 A1 | 11/2013 | Davidson | |
| 2014/0088870 A1 | 3/2014 | Varoglu | |
| 2014/0129121 A1 | 5/2014 | Fino | |
| 2015/0177011 A1 | 6/2015 | Ibrahimi | |
| 2015/0248795 A1 | 9/2015 | Davidson | |
| 2016/0031459 A1 | 2/2016 | Murren | |
| 2016/0075333 A1 | 3/2016 | Sujan | |
| 2016/0180705 A1 | 6/2016 | Liu et al. | |
| 2017/0039500 A1 | 2/2017 | Leidner | |
| 2017/0059337 A1 | 3/2017 | Barker | |
| 2017/0078380 A1 | 3/2017 | Aggarwal | |
| 2017/0169377 A1 | 6/2017 | Liu | |
| 2017/0185087 A1 | 6/2017 | Petroff | |
| 2017/0200374 A1 | 7/2017 | Yanagihara | |
| 2017/0213205 A1 | 7/2017 | Sinai | |
| 2017/0282942 A1 | 10/2017 | Mathews, Jr. | |
| 2017/0293296 A1 | 10/2017 | Stenneth | |
| 2017/0309172 A1 | 10/2017 | Linder | |
| 2017/0351987 A1 | 12/2017 | Liu | |
| 2018/0001954 A1 | 1/2018 | Uimonen | |
| 2018/0010954 A1 | 1/2018 | Lowndes | |
| 2018/0081374 A1 | 3/2018 | Nimchuk | |
| 2018/0143643 A1 | 5/2018 | Fairfield | |
| 2018/0225962 A1 | 8/2018 | Nakamura | |
| 2018/0255428 A1 | 9/2018 | Bagchi | |
| 2018/0276351 A1 | 9/2018 | Patton | |
| 2019/0012909 A1 | 1/2019 | Mintz | |
| 2019/0017828 A1 | 1/2019 | Harish | |
| 2019/0020973 A1 | 1/2019 | Harish | |
| 2019/0080180 A1 | 3/2019 | Lyon | |
| 2019/0180382 A1 | 6/2019 | Cowper | |
| 2019/0186937 A1 | 6/2019 | Sharifi | |
| 2019/0241192 A1 | 8/2019 | Matthews | |
| 2019/0272500 A1 | 9/2019 | Haque | |
| 2019/0286793 A1 | 9/2019 | Patton | |
| 2019/0293443 A1 | 9/2019 | Kelly | |
| 2019/0303809 A1 | 10/2019 | Karambatsos | |
| 2019/0376801 A1 | 12/2019 | Whitt et al. | |
| 2020/0011682 A1 | 1/2020 | Okabe | |
| 2020/0019173 A1 | 1/2020 | Chen | |
| 2020/0097009 A1 | 3/2020 | Garg | |
| 2020/0111348 A1 | 4/2020 | Gentile | |
| 2020/0192363 A1 | 6/2020 | Landy | |
| 2020/0219070 A1 | 7/2020 | Rosenzweig | |
| 2020/0234582 A1 | 7/2020 | Mintz | |
| 2020/0242922 A1 | 7/2020 | Dulberg | |
| 2020/0282980 A1 | 9/2020 | Kinoshita | |
| 2020/0294328 A1 | 9/2020 | Kawashima et al. | |
| 2020/0298825 A1 | 9/2020 | Kurihashi | |
| 2020/0410419 A1 | 12/2020 | Margines | |
| 2021/0020047 A1 | 1/2021 | Kuhn | |
| 2021/0068712 A1 | 3/2021 | Humblet | |
| 2021/0112388 A1 | 4/2021 | Rosales | |
| 2021/0192356 A1 | 6/2021 | Moridi | |
| 2021/0223051 A1 | 7/2021 | Hochberg et al. | |
| 2021/0239484 A1 | 8/2021 | Holder | |
| 2021/0293560 A1 | 9/2021 | Walker | |
| 2021/0380013 A1 | 12/2021 | Moszynski | |
| 2022/0276066 A1 | 9/2022 | Beaurepaire | |

OTHER PUBLICATIONS

Extended European Search Report for European Application No. 22176009.3, dated Nov. 2, 2022, 12 Pages.

* cited by examiner

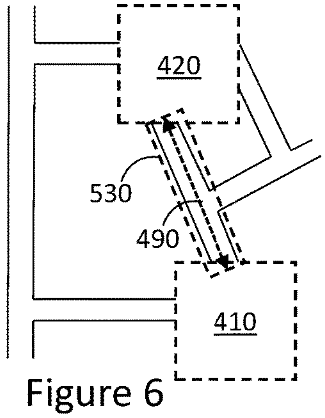
Figure 6
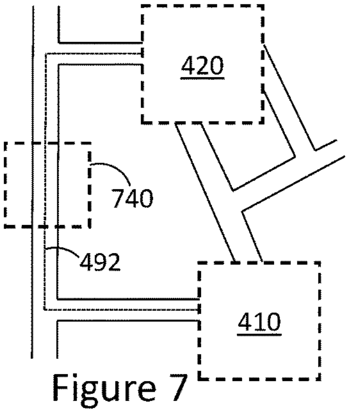
Figure 7
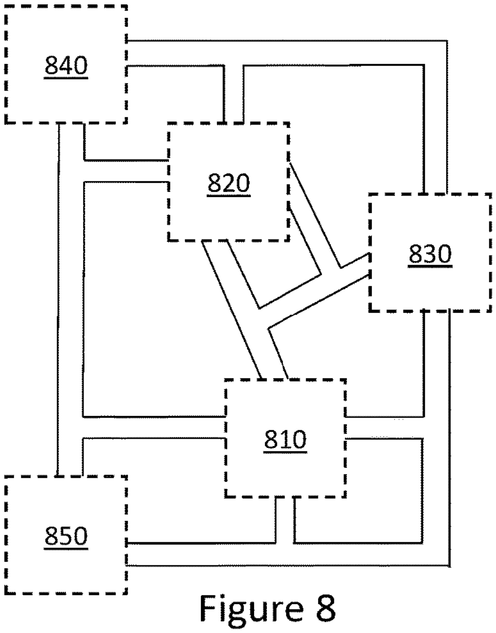
Figure 8
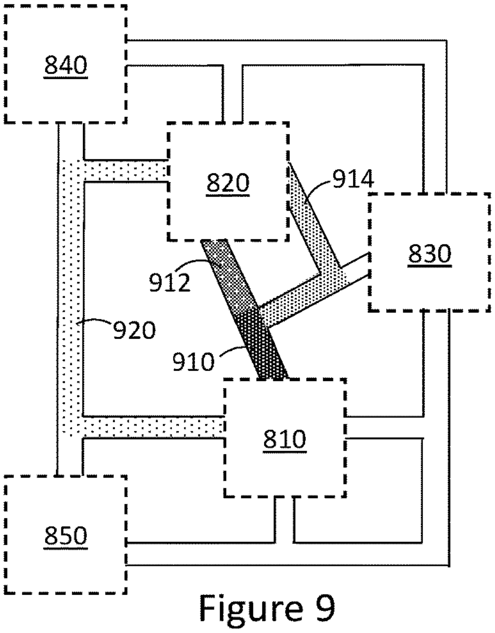
Figure 9
Destination
Origin
| Region | 810 | 820 | 830 | 840 | 850 |
|---|---|---|---|---|---|
| 810 | 5,245 | 1,112 | 1.065 | 987 | 1,258 |
| 820 | 1,286 | 3,656 | 984 | 823 | 625 |
| 830 | 1,022 | 906 | 1,526 | 758 | 426 |
| 840 | 1,003 | 805 | 769 | 4,895 | 489 |
| 850 | 1,320 | 598 | 452 | 475 | 2,784 |
Figure 10

METHODS FOR ANALYZING VEHICLE TRAFFIC BETWEEN GEOGRAPHIC REGIONS

PRIOR APPLICATION DATA

This patent application claims priority to U.S. Provisional Patent Application No. 63/195,260 titled Systems and Methods for Analyzing Vehicle Traffic, filed on Jun. 1, 2021.

TECHNICAL FIELD

The present disclosure generally relates to analysis of vehicle traffic, and in particular relates to systems and methods for determining journeys made by vehicles.

BACKGROUND

Telematics systems have been employed by fleet owners to monitor use and performance of vehicles in the fleet. This has resulted in improved performance and maintenance of vehicles in the fleet. Data from such telematics systems can also be useful to analyze traffic, to provide information for infrastructure design, planning, and implementation.

SUMMARY

According to a broad aspect, the present disclosure describes a method comprising: receiving an identification of a first geographic region; receiving an identification of a second geographic region; determining a number of vehicle journeys between the first geographic region and the second geographic region in at least a time interval, by: receiving location data for a plurality of vehicles, the location data indicative of a succession of a plurality of trips travelled by each vehicle and indicative of at least one rest period of each vehicle wherein the respective vehicle is not moving, each trip in the plurality of trips being separated from a preceding trip by a respective rest period of the at least one rest period; determining, for each vehicle in the plurality of vehicles, a number of journeys travelled between the first geographic region and the second geographic region by the vehicle, by: comparing each rest period of the at least one rest period for the vehicle to journey criteria; and tabulating a number of journeys by the vehicle between the first geographic region and the second geographic region, where one journey includes one or more successive trips of the plurality of trips, each of the successive trips separated from each other by a respective rest period of the at least one rest period which satisfies the journey criteria, and the successive trips together representing travel between the first geographic region and the second geographic region.

The first geographic region and the second geographic region may be different. The first geographic region and the second geographic region may be the same.

The method may further comprise receiving an identification of a third geographic region, wherein: the first geographic region, the second geographic region, and the third geographic region are different; successive trips together counted as a journey represent travel between the first geographic region and the second geographic region, through the third geographic region.

The method may further comprise receiving an identification of a plurality of additional geographic regions, wherein: the first geographic region, the second geographic region, and the plurality of additional geographic regions are different from each other; successive trips together counted as a journey represent travel between the first geographic region and the second geographic region, through at least one of the plurality of additional geographic regions. Successive trips together counted as a journey may represent travel between the first geographic region and the second geographic region, through each of the plurality of additional geographic regions.

According to another broad aspect, the present disclosure describes a system comprising: at least one processor; at least one non-transitory processor-readable storage medium having instructions stored thereon, which when executed by the at least one processor cause the system to: receive an identification of a first geographic region; receive an identification of a second geographic region; determine a number of vehicle journeys between the first geographic region and the second geographic region in at least a time interval, by: receiving location data for a plurality of vehicles, the location data indicative of a succession of a plurality of trips travelled by each vehicle and indicative of at least one rest period of each vehicle wherein the respective vehicle is not moving, each trip in the plurality of trips being separated from a preceding trip by a respective rest period of the at least one rest period; determining, for each vehicle in the plurality of vehicles, a number of journeys travelled between the first geographic region and the second geographic region by the vehicle, by: comparing each rest period of the at least one rest period for the vehicle to journey criteria; and tabulating a number of journeys by the vehicle between the first geographic region and the second geographic region, where one journey includes one or more successive trips of the plurality of trips, each of the successive trips separated from each other by a respective rest period of the at least one rest period which satisfies the journey criteria, and the successive trips together representing travel between the first geographic region and the second geographic region.

The first geographic region and the second geographic region may be different. The first geographic region and the second geographic region may be the same.

The instructions when executed may further cause the system to receive an identification of a third geographic region, wherein: the first geographic region, the second geographic region, and the third geographic region are different; successive trips together counted as a journey represent travel between the first geographic region and the second geographic region, through the third geographic region.

The instructions when executed may further cause the system to receive an identification of a plurality of additional geographic regions, wherein: the first geographic region, the second geographic region, and the plurality of additional geographic regions are different from each other; successive trips together counted as a journey represent travel between the first geographic region and the second geographic region, through at least one of the plurality of additional geographic regions. Successive trips together counted as a journey may represent travel between the first geographic region and the second geographic region, through each of the plurality of additional geographic regions.

According to another broad aspect, the present disclosure describes a method comprising: receiving location data for a vehicle, the location data indicative of a succession of a plurality of trips travelled by the vehicle and indicative of at least one rest period of the vehicle wherein the vehicle is not moving, each trip in the plurality of trips being separated from a preceding trip by a respective rest period of the at least one rest period; determining at least one journey travelled by the vehicle, each journey inclusive of at least one trip of the plurality of trips, wherein determining the at least one journey includes: comparing each rest period of the at least one rest period to journey criteria; determining each journey of the at least one journey as including one or more successive trips of the plurality of trips, where each of the successive trips are separated from each other by a respective rest period of the at least one rest period which satisfies the journey criteria; and determining a respective end of each journey based on a respective rest period of the at least one rest period which does not satisfy the journey criteria.

The journey criteria may be a threshold time period, and comparing a particular rest period to the journey criteria may be indicative of the journey criteria being satisfied if the particular rest period is within the threshold time duration.

The journey criteria may be a classification of location, and comparing a particular rest period to the journey criteria may be indicative of the journey criteria being satisfied if the location of the vehicle during the particular rest period is within the classification of location.

The journey criteria may be a classification of location, and comparing a particular rest period to the journey criteria may be indicative of the journey criteria being satisfied if the location of the vehicle during the particular rest period is outside of the classification of location.

The journey criteria may include status information received from an hours-of-service logging device which indicates a working status of a driver of the vehicle, and comparing a particular rest period to the journey criteria may be indicative of the journey criteria being satisfied if the working status of the driver is indicative of the journey not being complete.

The journey criteria may include status information received from a vehicle management device, and comparing a particular rest period to the journey criteria may be indicative of the journey criteria being satisfied if the status information is indicative of the journey not being complete. The vehicle management device may be a taximeter which provides status information indicative of whether the vehicle is carrying a passenger, and comparing a particular rest period to the journey criteria may be indicative of the journey criteria being satisfied if the status information indicates that the vehicle is carrying a passenger. The vehicle management device may be a server which stores planned destination information which indicates a location of a planned destination for the vehicle, and comparing a particular rest period to the journey criteria may be indicative of the journey criteria being satisfied if the location of the vehicle during the particular rest period is proximate the location indicated in the planned destination information.

The may further comprise selecting the journey criteria based on a class of the vehicle. The method may further comprise selecting the journey criteria based on a vocation of the vehicle.

According to another broad aspect, the present disclosure describes a system comprising: at least one processor; at least one non-transitory processor-readable storage medium having instructions stored thereon, which when executed by the at least one processor cause the system to: receive location data for a vehicle, the location data indicative of a succession of a plurality of trips travelled by the vehicle and indicative of at least one rest period of the vehicle wherein the vehicle is not moving, each trip in the plurality of trips being separated from a preceding trip by a respective rest period of the at least one rest period; determine at least one journey travelled by the vehicle, each journey inclusive of at least one trip of the plurality of trips, wherein the instructions which cause the system to determine the at least one journey cause the system to: compare each rest period of the at least one rest period to journey criteria; determine each journey of the at least one journey as including one or more successive trips of the plurality of trips, where each of the successive trips are separated from each other by a respective rest period of the at least one rest period which satisfies the journey criteria; and determine a respective end of each journey based on a respective rest period of the at least one rest period which does not satisfy the journey criteria.

The journey criteria may be a threshold time period, and comparison of a particular rest period to the journey criteria may be indicative of the journey criteria being satisfied if the particular rest period is within the threshold time duration.

The journey criteria may be a classification of location, and comparison of a particular rest period to the journey criteria may be indicative of the journey criteria being satisfied if the location of the vehicle during the particular rest period is within the classification of location.

The journey criteria may be a classification of location, and comparison of a particular rest period to the journey criteria may be indicative of the journey criteria being satisfied if the location of the vehicle during the particular rest period is outside of the classification of location.

The journey criteria may include status information received from an hours-of-service logging device which indicates a working status of a driver of the vehicle, and comparison of a particular rest period to the journey criteria may be indicative of the journey criteria being satisfied if the working status of the driver is indicative of the journey not being complete.

The journey criteria may include status information received from a vehicle management device, and comparison of a particular rest period to the journey criteria may be indicative of the journey criteria being satisfied if the status information is indicative of the journey not being complete. The vehicle management device may be a taximeter which provides status information indicative of whether the vehicle is carrying a passenger, and comparison of a particular rest period to the journey criteria may be indicative of the journey criteria being satisfied if the status information indicates that the vehicle is carrying a passenger. The vehicle management device may be a server which stores planned destination information which indicates a location of a planned destination for the vehicle, and comparison of a particular rest period to the journey criteria may be indicative of the journey criteria being satisfied if the location of the vehicle during the particular rest period is proximate the location indicated in the planned destination information.

The journey criteria may be selected based on a class of the vehicle. The journey criteria may be selected based on a vocation of the vehicle.

BRIEF DESCRIPTION OF THE DRAWINGS

Exemplary non-limiting embodiments are described with reference to the accompanying drawings in which:

FIGS. 2, 3, 4, 5, 6, 7, 8, and 9 are top views illustrating respective geographic regions and journeys between regions, in accordance with at least eight illustrated implementations.

FIG. 10 is a table which shows numbers of journeys between geographic regions.

DETAILED DESCRIPTION

Figure 1:
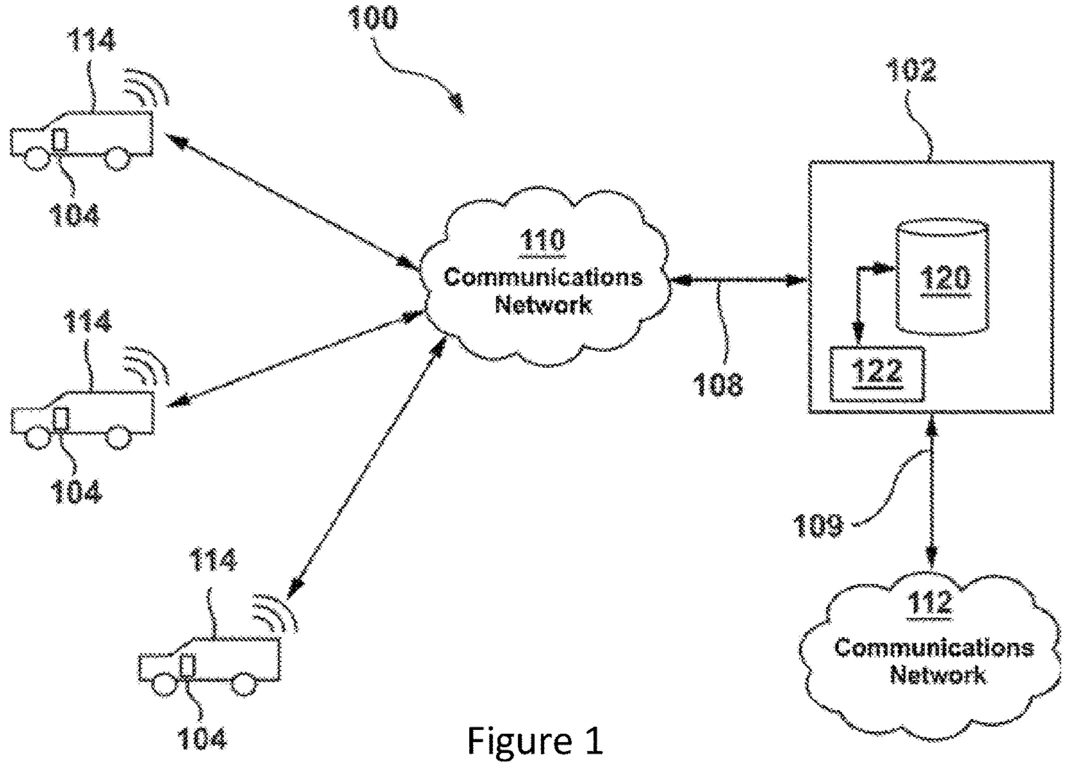
FIG. 1 is a block diagram of an exemplary telematics system for gathering and storing vehicle information.

Telematics systems have been employed by fleet owners to monitor use and performance of vehicles in the fleet. A telematics system monitors a vehicle using an onboard telematic monitoring device for gathering and transmitting vehicle operation information. For instance, fleet managers can employ telematics to have remote access to real time operation information of each vehicle in a fleet. A vehicle may include a car, truck, recreational vehicle, heavy equipment, tractor, snowmobile or other transportation asset. A telematic monitoring device may detect environmental operating conditions associated with a vehicle, for example, outside temperature, attachment status of an attached trailer, and temperature inside an attached refrigeration trailer. A telematic monitoring device may also detect operating conditions of an associated vehicle, such as position, (e.g., geographic coordinates), speed, and acceleration, time of day of operation, distance traveled, stop duration, customer location, idling duration, driving duration, among others. Hence, the telematic monitoring device collects and transmits data to the telematics system that is representative of the vehicle operation and usage execution. This data may be collected over a time period of sufficient duration to allow for pattern recognition of the vehicle's operation. In an example the duration may be determined to be a number of days between 30 days and 90 days, though in practice any appropriate number of days could be implemented as the duration.

In an exemplary telematics system, raw vehicle data, including vehicle operation information indicative of a vehicle's operating conditions, is transmitted from an onboard telematic monitoring device to a remote subsystem, (e.g., data management system which may comprise a cloud system or a management system). Raw vehicle data may include information indicating the identity of the onboard telematic monitoring device (e.g., device identifier, device ID) and/or the identity of the associated vehicle the onboard telematic monitoring device is aboard. Specific and non-limiting examples of raw vehicle data includes device ID data, position data, speed data, ignition state data, (e.g. indicates whether vehicle ignition is ON or OFF), and datetime data indicative of a date and time vehicle operating conditions were logged by the telematic monitoring device. Raw vehicle data transmitted and collected over a period of time forms historical vehicle data which may be stored by the remote subsystem for future analysis of a single vehicle or fleet performance. In practice, a single fleet may comprise many vehicles, and thus large volumes of raw vehicle data (e.g., terabytes, petabytes, exabytes . . . ) may be transmitted to, and stored by, a remote subsystem.

In other exemplary telematics systems, a telematic monitoring device can have at least one processing unit thereon which processes or filters raw vehicle data, and transmits processed or filtered data. Such systems can reduce the bandwidth required for transmission and required storage capacity for transmitted data.

The use of telematics systems has resulted in improved performance and maintenance of vehicles in the fleet. Additionally, data from telematics systems can also be useful to analyze traffic, to provide information for infrastructure design, planning, and implementation.

The present disclosure describes systems and methods for analyzing vehicle traffic. In particular, the present disclosure describes systems and methods for determining journeys by vehicles, and counting a number of journeys across a plurality of vehicles.

Illustrated in FIG. 1 is a simplified block diagram of an exemplary telematics system for gathering and storing vehicle operation information. Telematics system 100 comprises telematics subsystem 102 having a first network interface 108 and onboard telematic monitoring devices 104 of vehicles 114 communicatively coupled therewith via communication network 110.

The telematics subsystem 102 in an implementation comprises a management system which is a managed cloud data warehouse for performing analytics on data stored therein. In another implementation, the management system may comprise a plurality of management systems, datastores, and other devices, configured in a centralized, distributed or other arrangement. In some implementations, one or more different management systems may be employed and configured separately or in a centralized, distributed or other arrangement. In the illustrated example, telematics subsystems 102 includes at least one non-transitory processor-readable storage medium 120 and at least one processor 122. The at least one non-transitory processor-readable storage medium 120 can store data on which analytics is performed, and/or can store instructions thereon. Said instructions, when executed by the at least one processor 122, cause the telematics subsystem to perform the desired operations, analysis, or data collection/aggregation.

Communication network 110 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 110 may operate according to one or more communication protocols, such as, General Packet Radio Service (GPRS), Universal Mobile Telecommunications Service (UMTS), GSM, Enhanced Data Rates for GSM Evolution (EDGE), LTE, CDMA, LPWAN, Wi-Fi, Bluetooth, Ethernet, HTTP/S, TCP, and CoAP/DTLS, or other suitable protocol. Communication network 110 may take other forms as well.

Telematics system 100 may comprise another network interface 109 for communicatively coupling to another communication network 112. In an implementation, communication network 112 may comprise a communication gateway between the fleet owners and the telematics system 100.

Also shown in FIG. 1 are vehicles 114, each thereof having aboard the onboard telematic monitoring devices 104. A vehicle may include a car, truck, recreational vehicle, heavy equipment, tractor, snowmobile, or other transportation asset. Onboard telematic monitoring devices 104 may transmit raw vehicle data associated with vehicles 114 through the communication network 110 to the telematics subsystem 102.

Three telematic monitoring devices 104 are described in this example for explanation purposes only and embodiments are not intended to be limited to the examples described herein. In practice, a telematics system may comprise many vehicles 114, such as hundreds, thousands and tens of thousands or more. Thus, huge volumes of raw vehicle data may be received and stored by remote telematics subsystem 102.

In general, telematic monitoring devices 104 comprise sensing modules configured for sensing and/or measuring a physical property that may indicate an operating condition of a vehicle. For example, sensing modules may sense and/or measure a vehicle's position, (e.g., GPS coordinates), speed, direction, rates of acceleration or deceleration, for instance, along the x-axis, y-axis, and/or z-axis, altitude, orientation, movement in the x, y, and/or z direction, ignition state, transmission and engine performance, and times of operation among others. One of ordinary skill in the art will appreciate that these are but a few types of vehicle operating conditions that may be detected.

Telematic monitoring device 104 may comprise a sensing module for determining vehicle position. For instance, the sensing module may utilize Global Positioning System (GPS) technology (e.g., GPS receiver) for determining the geographic position (Lat/Long coordinates) of vehicle 114. Alternatively, the sensing module can utilize another global navigation satellite system (GNSS) technology, such as, GLONASS or BeiDou. Alternatively, the sensing module may further utilize another kind of technology for determining geographic position. In addition, the sensing module may provide other vehicle operating information, such as speed. Alternatively, the telematic monitoring device 104 may communicate with a plurality of sensing modules for a vehicle.

Alternatively, vehicle position information may be provided according to another geographic coordinate system, such as, Universal Transverse Mercator, Military Grid Reference System, or United States National Grid.

In general, a vehicle 114 may include various control, monitoring and/or sensor modules for detecting vehicle operating conditions. Some specific and non-limiting examples include, an engine control unit (ECU), a suspension and stability control module, a headlamp control module, a windscreen wiper control module, an anti-lock braking system module, a transmission control module, and a braking module. A vehicle may have any combination of control, monitoring and/or sensor modules. A vehicle may include a data/communication bus accessible for monitoring vehicle operating information, provided by one or more vehicle control, monitoring and/or sensor modules. A vehicle data/communication bus may operate according to an established data bus protocol, such as the Controller Area Network bus (CAN-bus) protocol that is widely used in the automotive industry for implementing a distributed communications network. Specific and non-limiting examples of vehicle operation information provided by vehicle monitoring and/or sensor modules include, ignition state, fuel tank level, intake air temp, and engine RPM among others.

Telematic monitoring device 104 may comprise a monitoring module operable to communicate with a data/communication bus of vehicle 114. The monitoring module may communicate via a direct connection, such as, electrically coupling, with a data/communication bus of vehicle 114 via a vehicle communication port, (e.g., diagnostic port/communication bus, OBDII port). Alternatively, the monitoring module may comprise a wireless communication interface for communicating with a wireless interface of the data/communication bus of vehicle 114. Optionally, a monitoring module may communicate with other external devices/systems that detect operating conditions of the vehicle.

Telematic monitoring device 104 may be configured to wirelessly communicate with telematics subsystem 102 via a wireless communication module. In some embodiments, telematic monitoring device 104 may directly communicate with one or more networks outside vehicle 114 to transmit data to telematics subsystem 102. A person of ordinary skill will recognize that functionality of some modules may be implemented in one or more devices and/or that functionality of some modules may be integrated into the same device.

Telematic monitoring devices 104 may transmit raw vehicle data, indicative of vehicle operation information collected thereby, to telematics subsystem 102. The raw vehicle data may be transmitted at predetermined time intervals, (e.g. heartbeat), intermittently, and/or according to other predefined conditions. Raw vehicle data transmitted from telematic monitoring devices 104 may include information indicative of device ID, position, speed, ignition state, and date and time operating conditions are logged, for instance, in an onboard datastore. One of ordinary skill in the art will appreciate that raw vehicle data may comprise data indicative of numerous other vehicle operating conditions. Raw vehicle data may be transmitted from a monitoring device when a vehicle is moving, stationary, and during both ON and OFF ignition states.

FIGS. 2, 3, 4, 5, 6, 7, 8, and 9 discussed below are top views of exemplary journeys on vehicle ways (e.g. roadways). Throughout this disclosure, a "journey" refers to travel between an origin and a destination. A journey may comprise multiple shorter "trips" as is discussed later with reference to FIGS. 11, 12, 13, 14, 15, 16, 17, 18, 19, and 20. A traffic analysis system can analyze, count, or tabulate journeys between origins and destinations as desired in order to provide a user of the traffic analysis system with information regarding traffic patterns and behavior. Discussion of "setting" a geographic region refers to the traffic analysis system being informed of a geographic region (e.g. by user input setting boundaries of the region), or the traffic analysis system determining the region (e.g. by a classification system of a machine learning algorithm). In some implementations, telematics subsystem 102 discussed above could be or could include a traffic analysis system, where the at least one processor 122 performs traffic or journey analysis based on data stored in the at least one non-transitory processor readable storage medium 120. In such implementations, the traffic analysis system can comprise instructions stored on the at least one non-transitory processor-readable storage medium 120, which when executed cause the traffic analysis system to perform the desired analysis (e.g. method 1100 of FIG. 11 or method 1900 of FIG. 19 as discussed later). In other implementations, a traffic analysis system can be separate from telematics subsystem 102 (as discussed later with reference to FIG. 21). Where appropriate, when stated herein that a traffic analysis system performs analysis or an action, said analysis or action can be considered as being performed by at least one processor of the traffic analysis system.

Figure 2:
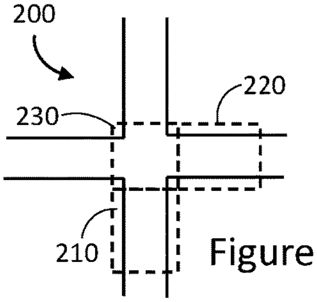

FIG. 2 is a top view of a vehicle intersection 200. Vehicle intersection 200 is illustrated as a four-way intersection (that is, four possible entrances or exits are available from the intersection). However, the discussion of FIG. 2 is applicable to any appropriate intersection. FIG. 2 illustrates three highlighted geographic regions 210, 220, and 230. Geographic region 210 encompasses one entrance/exit of the intersection, geographic region 220 encompasses another entrance/exit of the intersection, and geographic region 230 encompass a center of the intersection.

FIG. 2 illustrates an exemplary scenario for how determination of vehicle journeys is useful on a small scale. In an exemplary implementation, a traffic analysis system can count or tabulate a number of vehicle journeys between geographic region 210 and geographic region 220. Journeys can be determined in one direction (e.g. geographic region 210 is set as an origin, whereas geographic region 220 is set as a destination, or vice-versa), or journeys can be determined in both directions (e.g. both geographic region 210 and geographic region 220 as set as origins and destinations). A traffic analysis system can receive telematic data from vehicles (including location data), and analyze the telematic data to determine how many journeys are made in a given time frame between geographic region 210 and geographic region 220. In the example, such an analysis is indicative of how many times in the time frame vehicles turn right through the intersection from geographic region 210 (when set as an origin) to geographic region 220 (when set as a destination), or how many times in the time frame vehicles turn left through the intersection from geographic region 220 (when set as an origin) to geographic region 210 (when set as a destination), or both (when both geographic region 210 and geographic region 220 are set as an origin and a destination). In this example, geographic region 230 is not used in the analysis, and does not have to be provided to or determined by the traffic analysis system.

In another exemplary implementation, geographic region 230 can be set as a pass-through region, such that only journeys which pass through geographic region 230 are counted or tabulated. This can help to reduce error, for example requiring that a journey between geographic region 210 and geographic region 220 only be tabulated when the journey is made through the intersection. Further, in some implementations a journey may only be tabulated if the journey as made through the geographic regions within a set time. In an exemplary scenario, a vehicle enters the intersection from geographic region 210, passes straight through the intersection via geographic region 230, without turning into geographic region 220. The vehicle later returns to the intersection, and enters by geographic region 220. Because of the time interval between passing through region 230 and later entering geographic region 220, a journey between geographic region 210 and region 220 through region 230 may not be tabulated. Such an analysis is more accurate when the desired output is the number of right turns from region 210 to 220, for example.

In another exemplary implementation, geographic region 230 may be set as a pass-through region where journeys are tabulated without analysis of regions 210 and 220 (and geographic regions 210 and 220 do not have to be provided to or determined by the traffic analysis system). In such an implementation, any region outside of region 230 is an origin and a destination, such that a journey for a vehicle is tabulated when a vehicle enters and leaves region 230. This can be useful for analyzing overall traffic flow through intersection 200.

Appropriate geographic regions can be set to analyze any desired traffic flow through the intersection. Within a time frame being analyzed, a given vehicle can make multiple journeys, and each journey can be counted individually.

Figure 3:
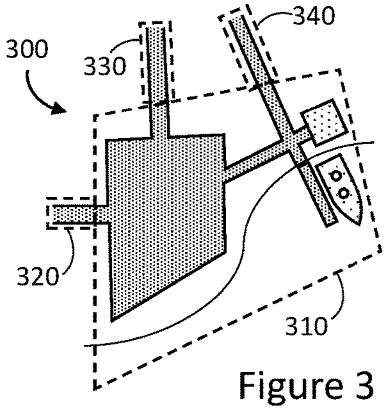

FIG. 3 is a top view of a port 300. A geographic region 310 is set as encompassing port 300. In the example port 300 has three entrances/exits, encompassed by geographic regions 320, 330, and 340.

In one implementation, geographic region 310 can be set as an origin, and each of geographic regions 320, 330, and 340 can be set as destinations. A traffic analysis system analyzes flow of traffic from port 300, by tabulating each vehicle journey from region 310 to each respective region 320, 330, and 340. In this way, how traffic flows from port 300 can be analyzed and understood.

In another implementation, each of geographic regions 310, 320, 330, and 340 can be set as an origin and a destination, such that traffic flow into and out of port 300 can be analyzed by a traffic analysis system.

In yet another implementation, geographic region 310 can be set as an origin and/or destination, with every region outside of geographic region 310 being set as an origin and/or destination. Such an implementation can be simpler to implement, and enables a traffic analysis system to tabulate journeys into and/or out from port 300.

Figure 4:
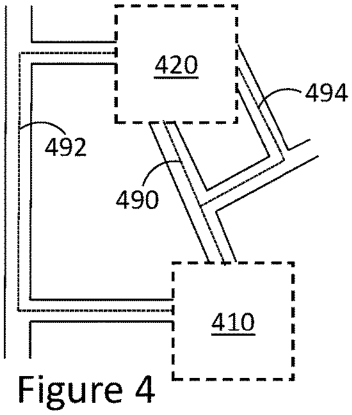

FIG. 4 is a top view of two geographic regions 410 and 420. More or less regions could be included as appropriate for a given application. Geographic regions 410 and 420 can be cities, counties, street blocks, street addresses, or any other type of geographic location as appropriate for a given application. Geographic regions 410 and 420 can be set as origins and/or destinations, so that a traffic analysis system can determine a number of vehicle journeys between regions 410 and 420. In the example of FIG. 4, no pass-through or connector regions are defined (as will be discussed in more detail with reference to FIGS. 5, 6, 7, and 20), and so the traffic analysis system will tabulate journeys between regions 410 and 420 by any route. In the example, routes 490, 492, and 494 are illustrated.

Figure 5:
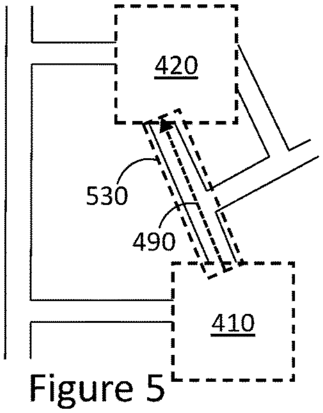

FIG. 5 is a top view of travel between two geographic regions 410 and 420, similar to as illustrated in FIG. 4. Description of FIG. 4 applies to FIG. 5 unless context dictates otherwise. One difference between FIG. 5 and FIG. 4 is that in FIG. 5, a connector region 530 is defined. When analyzed by a traffic analysis system, the traffic analysis system will only tabulate vehicle journeys which travel between region 410 and 420 via connector region 530. Connector region 530 can be set to be a specific roadway (such as a particular street, route, highway, or similar). This is useful for analyzing and understanding flow of traffic between regions along said roadway. Connector region 530 does not have to extend the entire distance between region 410 and 420; connector region 530 may represent only a portion of the journey.

Another difference between FIG. 5 and FIG. 4 is that in FIG. 5, travel along route 490 is illustrated with a one-directional arrow. In the illustrated example of FIG. 5, region 410 is set as an origin, and region 420 is set as a destination. As such, only vehicle journeys from region 410 to region 420, via connector region 530, will be tabulated by the analysis system.

FIG. 6 is a top view of travel between two geographic regions 410 and 420, similar to as illustrated in FIGS. 4 and 5. Description of FIGS. 4 and 5 applies to FIG. 6 unless context dictates otherwise. One difference between FIG. 6 and FIG. 5 is that in FIG. 6, travel along route 490 is illustrated with a two-directional arrow. In the illustrated example of FIG. 6, region 410 is set as both an origin and a destination, and region 420 is set as both an origin and a destination. As such, vehicle journeys between region 410 and region 420 regardless of travel direction, via connector region 530, will be tabulated by the analysis system.

FIG. 7 is a top view of travel between two geographic regions 410 and 420, similar to as illustrated in FIGS. 4, 5, and 6. Description of FIGS. 4, 5, and 6 applies to FIG. 7 unless context dictates otherwise. One difference between FIG. 7 and FIGS. 4, 5, and 6 is that in FIG. 7, a pass-through region 740 is defined. When analyzed by a traffic analysis system, the traffic analysis system will only tabulate vehicle journeys which travel between region 410 and 420, through pass-through region 740. Pass-through region can be set to be a city, county, street block, street address, or any other type of geographic location as appropriate for a given application, similar to regions 410 and 420. This is useful for analyzing and understanding flow of traffic between regions along a particular route or through a particular region. Pass-through region 740 and connector region 530 in FIG. 5 are similar, with connector region 530 being aimed at delineating a roadway, whereas pass-through region 740 delineates a broader region through which a vehicle may pass.

FIG. 8 is a top view of five geographic regions 810, 820, 830, 840, and 850. More or less regions could be included as appropriate for a given application. Geographic regions 810, 820, 830, 840, 850 can be cities, counties, street blocks, street addresses, or any other type of geographic location as appropriate for a given application, similar to geographic regions 410 and 420 in FIG. 4. Geographic regions 810, 820, 830, 840, and 850 can be set as origins and destinations, so that a traffic analysis system can determine a number of vehicle journeys between regions 810, 820, 830, 840, and 850. In the example of FIG. 8, no pass-through or connector regions are defined, and so the traffic analysis system will tabulate journeys between regions 810, 820, 830, 840, and 850 by any route.

FIG. 9 is a top map-view of the five geographic regions 810, 820, 830, 840, and 850 as illustrated in FIG. 8. FIG. 9 also shows information on popularity of routes between an origin and destination. This is discussed in detail with additional reference to FIG. 10 below.

FIG. 10 is a table which shows vehicle journeys between regions 810, 820, 830, 840, and 850 illustrated in FIGS. 8 and 9. Each region is listed in the left-most column of the table as an origin, and each region is listed in the top row of the table as a destination. The table is populated with a number of vehicle journeys for each origin-destination pair. For a cell where the origin region and the destination region are the same, the number of journeys in the cell indicates journeys which begin and end within the region. The numbers of journeys in FIG. 10 is merely exemplary, and will be dependent on specific regions being analyzed, traffic patterns in said regions, and prevalence of telematic system in said regions.

The table of FIG. 10 can be produced as an output by a traffic analysis system, to provide a user with information about traffic among a plurality of regions of interest. For example, the user can define regions 810, 820, 830, 840 and 850 as being regions of interest (for example by defining them on a map displayed on a screen), then the traffic analysis system can tabulate journeys between the different regions, and output the results as shown in FIG. 10 (for example by displaying FIG. 10 on a screen). The user can select a cell of the table in FIG. 10 (e.g. by clicking on it, for interfaces which use a mouse or touchscreen). In response, the analysis system can display the most popular routes between the origin and destination for the selected cell. In the example of FIGS. 9 and 10, a user selects the cell corresponding to journeys with region 820 as the origin and region 810 as the destination (outlined in bold in FIG. 10). The traffic analysis system highlights and displays the most popular routes for journeys from region 820 to 810 as shown in FIG. 9. In FIG. 9, a darker highlight indicates a more popular route, though other highlighting schemes are possible, such as different colors. In particular, route 912 is more popular than route 914 (i.e. more vehicle journeys from region 820 to region 810 use route 912 compared to route 914). Routes 912 and 914 converge on route 910, and as such route 910 is shaded even darker in FIG. 9. Route 920 is less popular than routes 910, 912 and 914, but still has some level of traffic, and as such is shaded lighter than routes 910, 912, and 914. In some implementations, a user could hover over or select a route shown in FIG. 9, and in response the analysis system can indicate a number of journeys which used the selected route.

As mentioned above, a "journey" refers to travel between an origin and a destination. A journey may comprise multiple shorter "trips". For example, a telematics system may be configured to parse vehicle travel into trips, where a trip ends with a "rest period" characterized by certain conditions. For example, for a given vehicle, a trip could be determined as ending when the ignition of the vehicle is switched off (which indicates the start of a rest period), or when the vehicle hasn't moved for a specified amount of time (e.g. 200 seconds, though other time frames are possible). Note that just stopping (e.g. at a stop sign) does not necessarily delineate the end of a trip (though it can, if desired). While such trip definitions are useful in certain scenarios (e.g. determining operational periods of a vehicle for maintenance analysis or for legislated operation logging), they may not necessarily accurately capture the concept of a "journey" for understanding of traffic patterns as detailed above regarding FIGS. 2, 3, 4, 5, 6, 7, 8, 9 and 10. Further, such delineation of trips may be built into the telematics system, such that a traffic analysis system cannot easily modify the definition of a "trip" for more accurate traffic analysis. Therefore, it is desirable for a traffic analysis system to be able to analyze telematics data that is broken into successive trips separated from each other by rest periods, and determine journeys travelled by vehicles which can span a plurality of trips.

Figure 11:
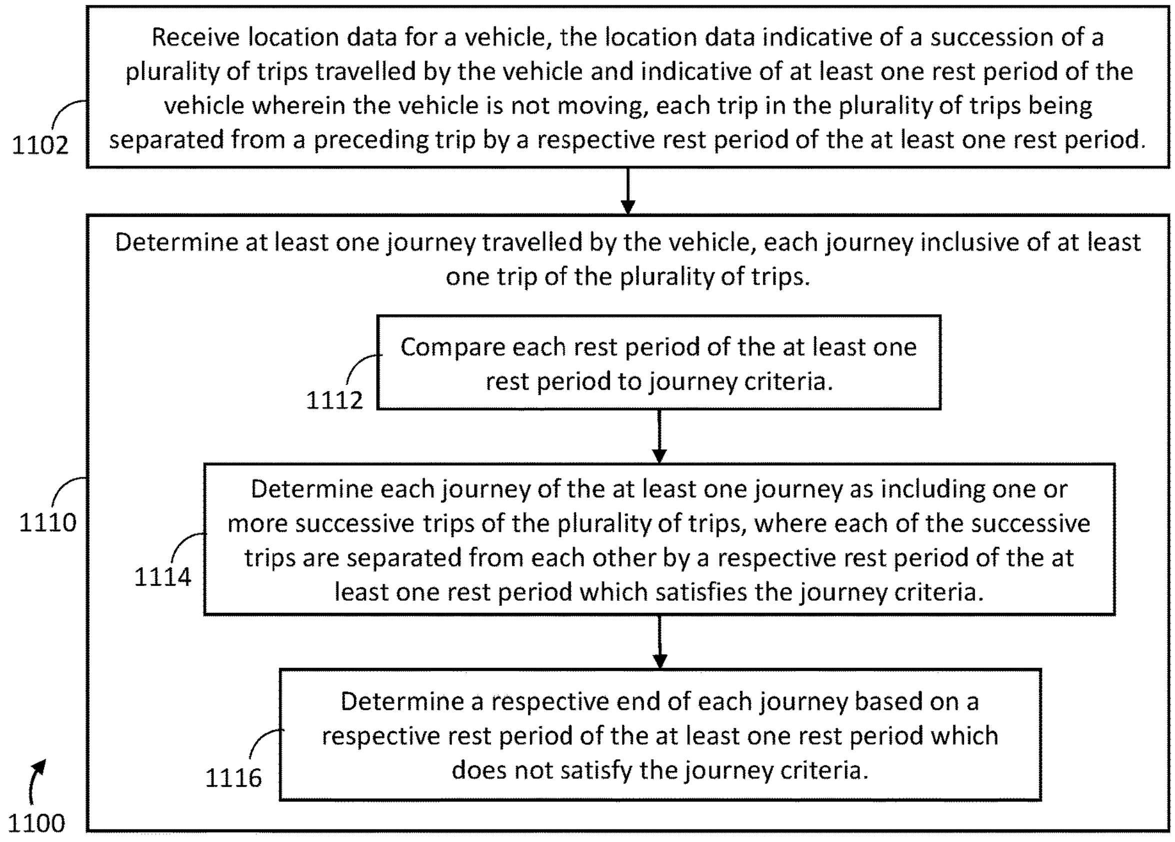
FIG. 11 is a flowchart diagram of a method of determining at least one journey travelled by a vehicle.

FIG. 11 is a flowchart diagram which illustrates an exemplary method 1100 for identifying journeys by a vehicle. Method 1100 as illustrated includes acts 1102 and 1110, and sub-acts 1112, 1114, and 1116. Additional acts could be added, acts could be removed, or acts could be reordered, as appropriate for a given application. Method 1100 could be implemented, for example, as instructions stored on a non-transitory processor-readable storage medium. Said instructions, when executed by at least one processor, can cause a traffic analysis system to perform method 1100. As mentioned above, telematics subsystem 102 in FIG. 1 could be or include such a traffic analysis system, or a traffic analysis system can be its own component, as discussed later with reference to FIG. 21. Generally, acts described as being performed by the traffic analysis system can be performed by at least one processor of the traffic analysis system unless context requires otherwise.

In act 1102, location data for a vehicle is received (e.g. by at least one processor of a traffic analysis system). The location data is indicative of a succession of a plurality of trips travelled by a vehicle and indicative of at least one rest period of the at least one vehicle wherein the vehicle is not moving (or the ignition is off). Each trip of the plurality of trips is separated from a preceding trip by a respective rest period of the at least one period. That is, the location data is indicative of a plurality of trips and alternating rest period (at least one rest period). Example sets of location data are discussed below with reference to FIGS. 12, 13, 15, and 18.

In act 1110, at least one journey travelled by the vehicle is determined (e.g. by at least one processor of the traffic analysis system). This includes sub-acts 1112, 1114, and 1116. In sub-act 1112, each rest period of the at least one rest period is compared to journey criteria. The journey criteria is indicative of whether the rest period delineates a separation between journeys, or whether the rest period is a rest mid-journey. Exemplary journey criteria are discussed below with reference to FIGS. 14, 15, 16, 17, and 18. In sub-act 1114, each journey of the at least one journey is determined. Each journey includes one or more successive trips of the plurality of trips, where each of the successive trips are separated from each other by a respective rest period of the at least one rest period which satisfies the journey criteria. That is, if the journey criteria are satisfied for a rest period, the rest period is identified as a mid-journey rest, and does not delineate the end of the journey. In sub-act 1116, a respective end of each journey is determined based on a respective rest period of the at least one rest period which does not satisfy the journey criteria. That is, if the journey criteria are not satisfied for a rest period, the rest period is identified as delineating the end of a journey.

Figure 12:
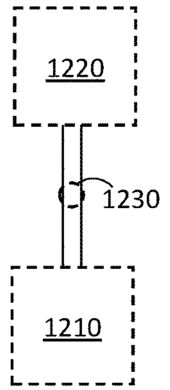
FIGS. 12 and 13 are top views illustrating respective journeys between geographic regions, where the journeys have at least one rest period mid-journey.

FIG. 12 is a top view of an exemplary journey with a rest period mid journey. FIG. 12 shows an origin geographic region 1210 and a destination geographic region 1220. FIG. 12 also shows a region 1230 where the vehicle underwent a rest period. For example, the rest period may have been to fill the vehicle with fuel, to use the bathroom, to eat a meal, to sleep, or any other appropriate cause for rest. Regardless of the rest, the vehicle journey is from geographic region 1210 to geographic region 1220, and through appropriate definition of journey criteria, a traffic analysis system can delineate the journey as such. Exemplary journey criteria are discussed later with reference to FIGS. 14, 15, 16, 17, and 18.

Figure 13:
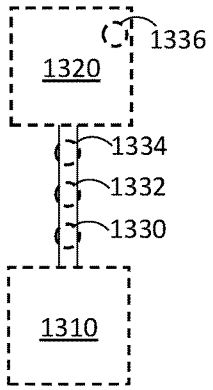

FIG. 13 is a top view of an exemplary journey with a plurality of rest periods mid journey. FIG. 13 is similar to FIG. 12, and description of FIG. 12 is applicable to FIG. 13 unless context dictates otherwise. FIG. 13 shows an origin geographic region 1310 and a destination geographic region 1320. FIG. 13 also shows a plurality of regions 1330, 1332, 1334, and 1336 where the vehicle underwent a rest period (such as those mentioned with reference to FIG. 12, or any other appropriate type of rest).

In some implementations, the location of the vehicle during a rest period can be used as journey criteria. For example, if a traffic analysis system has access to fleet management data, the traffic analysis system can determine that rest outside of a destination area does not delineate the end of a journey. That is, the journey criteria are satisfied for rest periods outside of a destination region, and the journey criteria is not satisfied for rest periods within the destination region. In the example illustrated in FIG. 13, regions 1330, 1332, and 1334 are on the way to region 1320 from region 1310. Region 1336 on the other hand, is located within destination region 1320. Based on this, a traffic analysis system can determine (as in sub-act 1114 of method 1100) that for the rest periods in regions 1330, 1332, and 1334, the journey criteria is satisfied (i.e. the vehicle is still on the journey). For the rest period in region 1336, the traffic analysis system can determine (as in sub-act 1116) that the journey criteria is not satisfied (i.e. the vehicle journey has finished).

Figure 14:
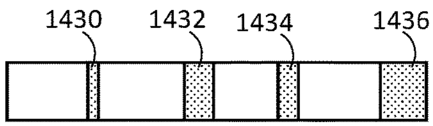
FIG. 14 is a time-block diagram which illustrates an exemplary journey having a plurality of rest periods mid-journey.

In other implementations, journey criteria can be the length of a rest period. FIG. 14 is a time-block diagram which illustrates exemplary periods of time for travel or rest during the journey of FIG. 13. In particular, FIG. 14 illustrates rest period 1430 in region 1330, rest period 1432 in region 1332, rest period 1434 in region 1334, and rest period 1436 in region 1336. In the example of FIG. 14, a threshold time for rest periods can be set, such that a rest period below the threshold time satisfies the journey criteria and does not delineate the end of a journey, whereas a rest period over the threshold time does not satisfy the journey criteria and does delineate the end of a journey. In the example of FIG. 14, each of rest periods 1430, 1432, and 1434 is shorter than the threshold, whereas rest period 1436 is longer than the threshold (e.g. the time while the driver is waiting for their vehicle to be unloaded). Consequently, the journey criteria is satisfied for rest periods 1430, 1432, and 1434, but not satisfied for rest period 1436, such that only rest period 1436 delineates the end of the journey.

Figure 15:
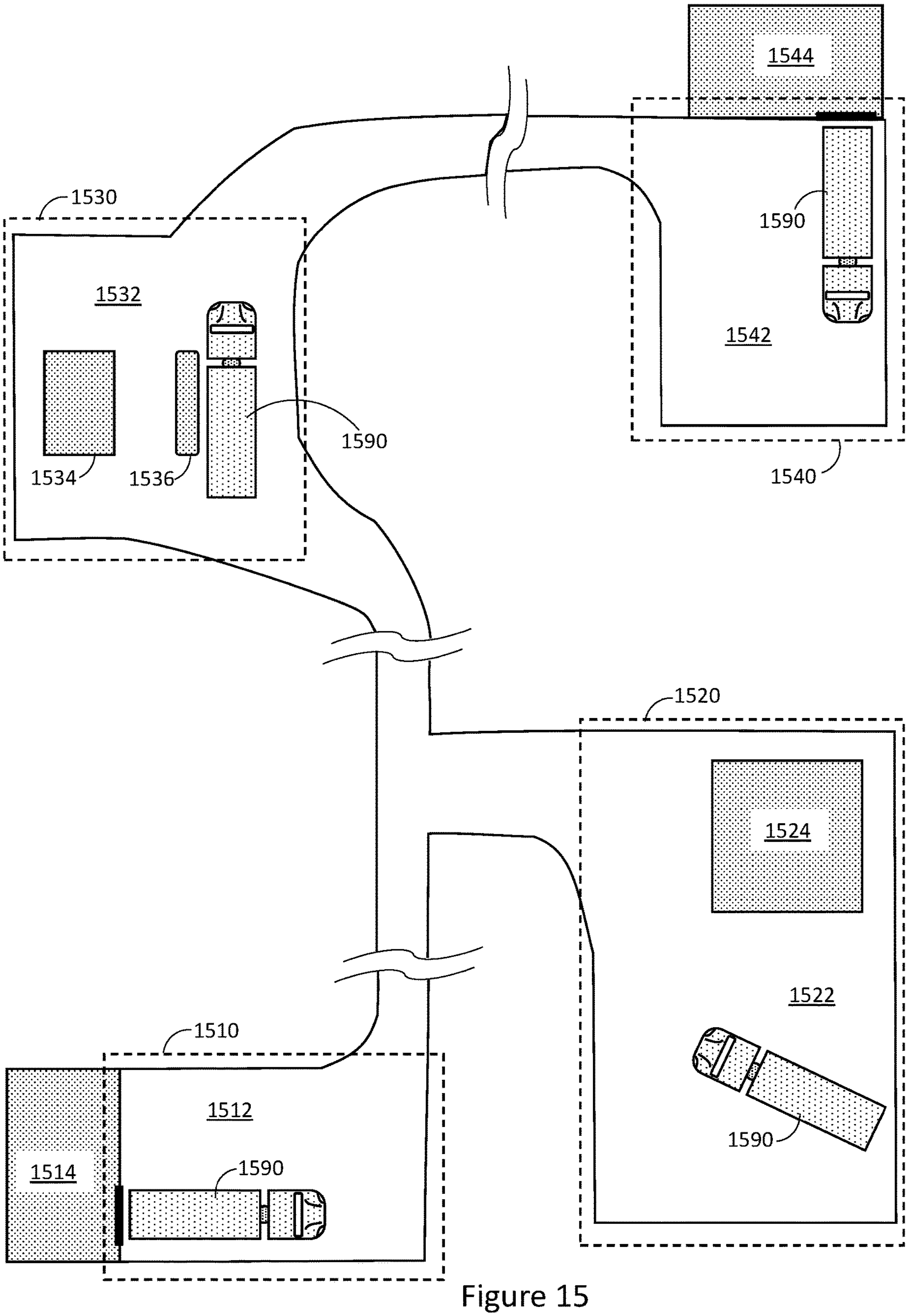
FIG. 15 is a top view illustrating a journey between geographic regions, where the journey has a plurality of rest periods at different locations mid-journey.

In yet other implementations, location classification can be used as journey criteria. FIG. 15 is a top view representing a vehicle journey by a truck 1590. FIG. 15 shows a plurality of regions 1510, 1520, 1530, and 1540 where rest periods take place. At region 1510, truck 1590 is parked in lot 1512 of a warehouse 1514, being loaded with cargo. Region 1510 is the origin region for this journey.

After being loaded, truck 1590 drives for a time, until taking a rest period in region 1520. Region 1520 encompasses a truck stop having a lot 1522 and a restaurant 1524. The driver of truck 1590 takes a rest period here to eat a meal.

After eating, truck 1590 drives for a time, until taking a rest period in region 1530 to refuel. Region 1530 encompasses a gas station having a lot 1532, convenience store 1534, and fuel pumps 1536.

After refueling, truck 1590 drives for a time, until a rest period in region 1540. Region 1540 is the destination region for this journey, and includes a warehouse having a lot 1542 and a warehouse building 1544. Truck 1590 is unloaded in region 1540.

Based on location classification, a traffic analysis system can determine the regions 1520 and 1530 satisfy the journey criteria (thus do not delineate the end of the journey), whereas regions 1510 and 1540 do not satisfy the journey criteria (thus do delineate the start or end of the journey). In particular, because region 1520 encompasses a truck stop (a common resting place mid-journey for trucks), region 1520 satisfies the journey criteria. Similarly, because region 1530 encompasses a gas station (another common resting place mid-journey for trucks), region 1530 satisfies the journey criteria. A truck stop and a gas station are examples of location classifications that satisfy the journey criteria, and many other type of locations could also have classifications which satisfy journey criteria, such as restaurants in general, weigh-stations, hotels, or any other location classification as appropriate for a given application.

FIG. 15 illustrates regions encompassing certain locations as being square, but this is not necessarily the case. Regions can be any appropriate shape.

In some implementations, regions for location classification could be manually defined, for example by an operator or administrator of a traffic analysis system drawing or selecting regions on map. In other implementations, regions could be automatically defined. For example, based on map data or labelling, locations such as "gas station", "restaurant", or "truck-stop" could automatically have encompassing regions delineated using an automated algorithm or AI, such as by image processing satellite images to delineate parking or road areas near the location. As another example, locations with appropriate labels could have a circular region defined therearound with a specific radius.

Further, journey criteria based on location classification can be changed or customized on a per-fleet, per-vehicle, per-vocation, or per-journey basis. As one example, a fleet may be responsible for delivering fuel to gas stations. For such a fleet, journey criteria can be set so that rest periods at gas stations do not satisfy the journey criteria (and thus delineate the end of a journey). Other changes and customizations can be made as appropriate for a given application.

Figure 17:
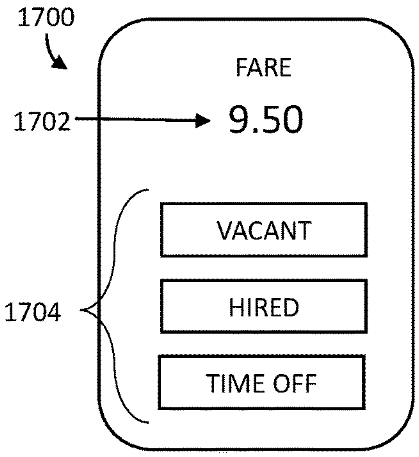
FIG. 17 illustrates an interface for a Taximeter.
Figure 18:
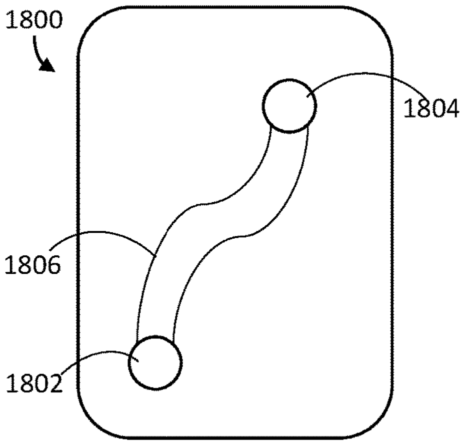
FIG. 18 illustrates an interface for a ride-hailing application.

A traffic analysis system can be communicatively coupled to and utilize information from other sources to enable more informed decision making regarding delineation of journeys. Several examples are illustrated in FIGS. 16, 17, and 18, as discussed below.

Figure 16:
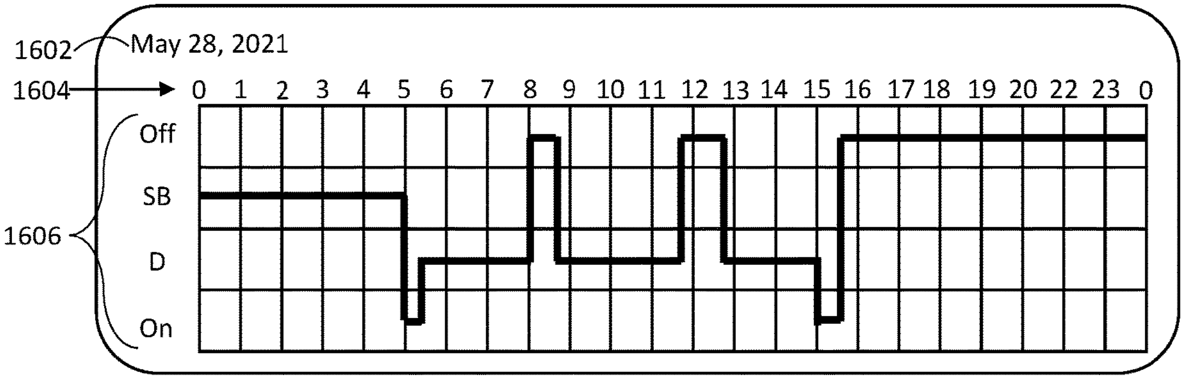
FIG. 16 illustrates an interface for an Hours-of-Service log.

FIG. 16 illustrates an exemplary user interface for an hours-of-service log, as is used in commercial vehicle fleets. In the example of FIG. 16, driver status is shown for a single day (May 28, 2021 in the example), as labelled by 1602, though displays of other time intervals are possible. A driver inputs hours into the log under a plurality of statuses. Hours in the day are labelled in a row as 1604, in a 24-hour system. In the illustrated example the statuses as labelled by 1606 are Off (Off-duty: the driver is not working), SB (Sleeper Berth: the driver is in their sleeper berth), D (Driving: the driver is driving the vehicle), and On (On Duty: the driver is working, but is not driving the vehicle; for example the driver could be performing a vehicle inspection, or be waiting while their vehicle is being loaded). A traffic analysis system could access logs like that illustrated in FIG. 16 (or any other appropriate logs which indicate a driver's status), for comparison against journey criteria to delineate one or more journeys of the vehicle.

The bold lines in the log of FIG. 16 indicate the status of the driver at a given time. From midnight to 5, the driver is in their sleeper berth. From 5 to 5:15, the driver is On Duty. From 5:15 to 8, the driver is driving. From 8 to 8:45, the driver is Off Duty. From 8:45 to 11:45, the driver is driving. From 11:45 to 12:45, the driver is Off Duty. From 12:45 to 15, the driver is driving. From 15 to 15:30, the driver is On Duty. From 15:30 until the end of the day, the Driver is Off Duty. For a telematics system which identifies as trip as ending when the vehicle is not in motion for a short duration (e.g. 200 seconds), the telematics system would identify three trip periods, where each period of driving is a separate trip. That is, one trip is delineated from 5:15 to 8, another trip is delineated from 8:45 to 11:45, and yet another trip is delineated from 12:45 to 15. However, the periods between these trips (the Off Duty periods from 8 to 8:45 and 11:45 to 12:45) could just be breaks in a longer journey. As such, delineating each of the separate trips in FIG. 16 as separate journeys may not be accurate for traffic pattern analysis. Instead, journey criteria could be set where Off Duty periods under a specified length (e.g. 1.5 hours, though other time periods are possible) satisfy the journey criteria. With such journey criteria, the rest periods from 8 to 8:45 and from 11:45 to 12:45 will satisfy the journey criteria (and thus will not delineate the end of the journey). On the other hand, the rest period after 3:30 will not satisfy the journey criteria, and thus will delineate the end of the journey. The other driver statuses could also be used to delineate journeys in a similar manner.

Data from other systems could also be accessed by a traffic analysis system to more accurately delineate journeys. FIG. 17 illustrates an exemplary interface for a taximeter 1700. A taxi driver provides input to taximeter 1700 to indicate a state of the taxi. The state can be indicated as labelled by 1704. In the illustrated example, the taxi states include Vacant (the taxi is not currently carrying a passenger and is available to pick up a passenger), Hired (the taxi is currently carrying a passenger), and Time Off (the taxi is not available to pick up a passenger). When hired, fare for the ride accumulates and is shown by the Fare indicator 1702. A traffic analysis system could use the state indicated by the taximeter to delineate journeys. For example, journey criteria could be setup to be satisfied even during a long rest period, when the taximeter indicates the Hired state. This can accurately capture journeys even in cases where the taxi has to wait when hired (e.g. at railway tracks, or while waiting for another passenger, etcetera). On the other hand, the journey criteria can be setup to not be satisfied when the taximeter indicates the Vacant or Time Off state, such that these states delineate the end of a journey.

FIG. 18 illustrates an exemplary interface 1800 for a ride-hailing service (such as those hired by a smartphone or similar device, e.g. Uber® or Lyft®). With such services, a passenger can specify a pickup location (origin) 1802 and a destination 1804. Alternatively, origin 1802 can be determined based on a current location of the passenger's device (e.g. smartphone). A route 1806 between the origin and destination is determined (e.g. by the user's device, or by a server to which the device is connected). A traffic analysis system can access this information, for more accurate analysis and delineation of journeys. For example, the journey criteria could be setup to be satisfied when the vehicle is still on route 1806, even if the vehicle rests for an extended period, such that the traffic system considers travel along the route to be part of a single journey. In such an example, the journey criteria can be setup to not be satisfied when vehicle leaves route 1806 (for example by straying from the route or by arriving at destination 1804), thereby delineating the end of the journey. As another example the journey criteria could be setup to not be satisfied when the vehicle is located at destination 1804, such that the journey is determined as ending when destination 1804 is reached.

Journey criteria can depend on what purpose or vocation a vehicle serves. The example of FIG. 15 is particularly applicable to long-haul shipping operations, where drivers need breaks to rest, refuel, etcetera, within a single journey. However, for other vocations where journeys are shorter (e.g. pizza delivery, intra-city package delivery, taxi or transport services), it may not be appropriate for such location classifications to satisfy journey criteria. In the example of pizza delivery, where a journey is defined as a vehicle taking pizza from a pizza store to a local address, refueling a vehicle is highly unlikely mid-journey. As such, a rest period at a gas station is indicative of the vehicle not being mid-journey, and thus rest periods at a gas station can be set to not satisfy journey criteria. Similar discussion applies to other restaurants, truck-stops, hotels, etcetera.

Vocation of a vehicle can be automatically determined, for example as described in U.S. Pat. No. 10,928,277 issued to Geotab Inc., the contents of which are incorporated herein in their entirety.

Additionally, journey criteria can also be performed based on vehicle class. For example, Semi-trucks are more likely to be used for long-haul trucking examples as in FIG. 15, whereas sedans are more likely to be used for purposes like pizza delivery or taxi services, such as discussed with reference to FIGS. 17 and 18.

Journey criteria can be setup using a plurality or combination of any appropriate metrics, such as those discussed above. In one implementation, location classification as discussed with reference to FIG. 15 could be combined with rest period duration as discussed with reference to FIG. 14. For example, journey criteria could be set up where the journey criteria is satisfied when a rest period occurs at a gas station, for no longer than 15 minutes. As another example, journey criteria could be set up where the journey criteria is satisfied when a rest period occurs at a restaurant for no longer than 90 minutes. The described location classifications and corresponding time thresholds are merely exemplary, and could be modified or adjusted as appropriate for a given application. By setting up time periods that generally encompass normal behavior or expected activities at the corresponding location, accuracy of the journey analysis can be increased.

In another implementation, driver status as discussed with reference to FIG. 16 can be combined with location classification as discussed with reference to FIG. 15. For example, if the driver is On Duty at a location like a weigh station or a truck stop, these can reasonably be assumed to be normal mid-journey safety activities, like having the vehicle weighed or performing a safety inspection. Thus, journey criteria can be setup to be satisfied when a rest period occurs at said location classifications, and the driver status indicates the Driver is On Duty.

The above discussed combinations are merely exemplary, and journey criteria can be setup using any appropriate combination of metrics, as appropriate for a given application.

Figure 19:
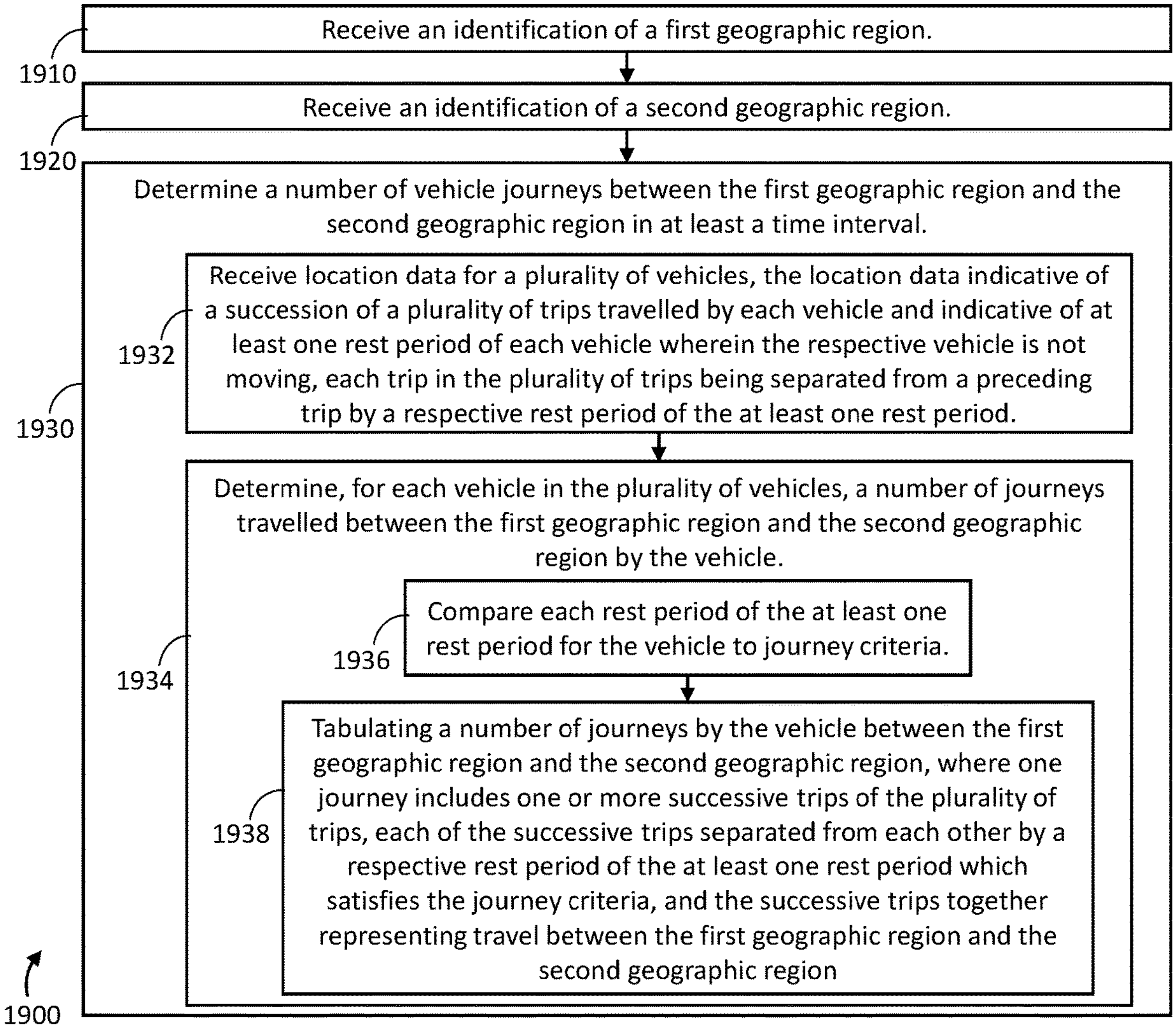
FIG. 19 is a flowchart diagram of a method of determining a number of vehicle journeys between geographic regions for a plurality of vehicles.

FIG. 19 is a flowchart diagram which illustrates an exemplary method 1900 for identifying vehicle journeys. Method 1900 as illustrated includes acts 1910, 1920, and 1930, and sub-acts 1932, 1934, 1936, and 1938. Additional acts could be added, acts could be removed, or acts could be reordered, as appropriate for a given application. Method 1900 could be implemented, for example, as instructions stored on a non-transitory processor-readable storage medium. Said instructions, when executed by at least one processor, can cause a traffic analysis system to perform method 1900. As mentioned above, telematics subsystem 102 in FIG. 1 could be or include such a traffic analysis system, or a traffic analysis system can be its own component, as discussed later with reference to FIG. 21. Generally, acts described as being performed by the traffic analysis system can be performed by at least one processor of the traffic analysis system unless context requires otherwise.

In act 1910, an identification of a first geographic region is received. In act 1920, an identification of a second geographic region is received. For example, the first and second geographic regions could be input to the traffic analysis system manually by an operator or administrator drawing or selecting regions on a map displayed by a screen. In other implementations, regions could be automatically defined. For example, based on map data or labelling, geographic regions could be automatically defined using an automated algorithm or AI. For example, areas with labels like "warehouse" or "depot" could be selected by an algorithm as the first and/or second region. In some implementations, common stopping locations (e.g. based on location data for vehicles from a fleet), could be received by the traffic analysis system, and these common stopping locations could be determined as the first and/or second geographic region. In some implementations, known origins or destinations can be received by the traffic analysis system, for example from fleet planning data (such as software or programs that manage vehicle trips, e.g. ride hailing applications, or shipping management software). For the first geographic region and the second geographic region, a region around a location can be determined or received, where such regions are determined for example by image processing satellite images to delineate parking or road areas near the location. As another example, locations with appropriate labels could have a circular region defined therearound with a specific radius.

In act 1930, a number of vehicle journeys between the first geographic region and the second geographic region within a time interval are determined. Determine of individual vehicle journeys is discussed in detail with reference to FIGS. 2 to 18, and the discussion thereof applies to FIG. 19. Act 1930 includes sub-acts 1932 and 1934, where sub-act 1934 in turn includes sub-acts 1936 and 1938.

In act 1932, location data for a plurality of vehicles is received. The location data is indicative of a succession of a plurality of trips travelled by each vehicle, and is indicative of at least one rest period of each vehicle wherein the respective vehicle is not moving. Each trip in the plurality of trips for each vehicle is separated from a preceding trip by a respective rest period of the at least one rest period. Stated differently, the location data for the plurality of vehicles is indicative of, for each vehicle, a series of alternating trip periods and rest periods (including at least one rest period).

In act 1934, a number of journeys travelled between the first geographic region and the second geographic region, for each vehicle, is determined. Act 1934 includes sub-acts 1936 and 1938.

In act 1936, each rest period of the at least one rest period for the vehicle is compared to journey criteria. Exemplary journey criteria are discussed above with reference to FIGS. 14, 15, 16, 17, and 18.

In act 1938, a number of journeys by the vehicle between the first geographic region and the second geographic region are tabulated. Each journey includes one or more successive trips of the plurality of trips for the vehicle, each of the successive trips are separated from each other by a rest period of the at least one rest period which satisfies the journey criteria. The successive trips together represent travel between the first geographic region and the second geographic region. Act 1938 is similar to act 1114 in method 1100, in that a sequence of trips can be chained together into a journey if the rest periods between each trip satisfy journey criteria. Similar to act 1116 in method 1110, the end of a journey is delineated by a rest period which does not satisfy the journey criteria.

In method 1900 of FIG. 19, journeys between a first geographic region and a second geographic region are identified similarly to as discussed above with reference to FIGS. 11, 12, 13, 14, 15, 16, 17, and 18. A number of such journeys within a specified time frame are tabulated, to determine a number of journeys between the first geographic region and the second geographic region for the vehicle. Similar analysis is performed for each vehicle of a plurality of vehicles, to determine a number of vehicle journeys between the first geographic region and the second geographic within the time frame accounting for a plurality of vehicles.

Although method 1900 describes tabulating journeys for a plurality of vehicles, this tabulation of vehicles uses location data from devices in vehicles, such as telematics monitoring devices. It is not necessarily the case that every vehicle on the road will be equipped with such a device. Further, telematic monitoring data may be subject to limited availability (for example, even if multiple fleets or companies receive telematic data, a traffic analysis system may not have access to data from every fleet or company). Consequently, the number of tabulated journeys can be representative of total number of vehicle journeys, but may not exactly match total number of vehicle journeys. The traffic analysis system can perform simulation, predictive analysis, or other forms of mathematics to extrapolate journey data from representative vehicles to estimate total vehicle travel. This could be performed on the basis of a known or estimated percentage of vehicles for which data is available to the traffic analysis system, knowledge of vehicle classes or vocations for vehicles for which data is available to the traffic system, or any other appropriate criteria. In some implementations, the traffic analysis system may only be interested in tabulating journeys for specific vehicle classes or vocations (e.g. commercial vehicle operations), so the tabulated number of journeys could be extrapolated based on a known percentage of vehicles of the desired vocation or class.

In some implementations, the first geographic region and a second geographic region are different, such that the determined number of journeys is indicative of journeys between the two different regions. Such implementations are illustrated throughout FIGS. 2, 3, 4, 5, 6, 7, 8, 9, 10, 12, 13, 15, and 18.

In another implementation, the first geographic region and the second geographic region are the same, such that determination of the number of journeys is indicative of a number of journeys within a geographic region. This is illustrated in FIG. 10, where certain cells indicate a number of journeys between an origin region which is the same as a destination region.

In yet another implementation, method 1900 further comprises receiving an identification of a third geographic region, wherein the first geographic region, the second geographic region, and the third geographic region are different. Successive trips counted together as a journey represent travel between the first region and the second region, through the third region. This is illustrated in FIGS. 5, 6, and 7, which illustrate journeys through connector regions or pass-through regions.

In yet another implementation, method 1900 further comprises receiving an identification of a plurality of additional geographic regions (additional to the first and second geographic regions), wherein the first geographic region, the second geographic region, and the plurality of additional geographic regions are different from each other. Successive trips together counted as a journey represent travel between the first region and the second region, through at least one of the plurality of additional geographic regions. In yet another implementation, successive trips together counted as a journey represent travel between the first region and the second region, through each of the plurality of additional geographic regions. This is illustrated in FIG. 20, discussed below.

Figure 20:
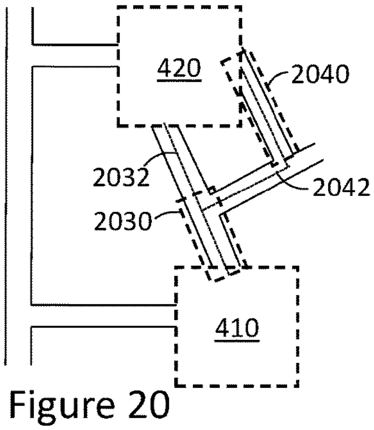
FIG. 20 is a top view illustrating geographic regions and journeys between the geographic region, through connector or pass-through regions.

FIG. 20 is a top map view of travel between two geographic regions 410 and 420, similar to as illustrated in FIGS. 4, 5, 6, and 7. Description of FIGS. 4, 5, 6, and 7 applies to FIG. 20 unless context dictates otherwise. One difference between FIG. 20 and FIGS. 4, 5, 6, and 7 is that in FIG. 20, a plurality of connector regions (or pass-through regions) 2030 and 2040 are defined, which can be similar to connector region 530 in FIGS. 5 and 6 or pass-through region 740 in FIG. 7. In some implementations, when analyzed by a traffic analysis system, the traffic analysis system will only tabulate vehicle journeys which travel between region 410 and 420, through one of connector regions 2030 or 2040. In such implementations, tabulated journeys could include journeys along both route 2032 and route 2042 shown in FIG. 20. In other implementations, when analyzed by a traffic analysis system, the traffic analysis system will only tabulate vehicle journeys which travel between region 410 and 420, through both of connector regions 2030 and 2040. In such implementations, journeys along route 2042 will be tabulated, but journeys along route 2032 will not be tabulated.

Figure 21:
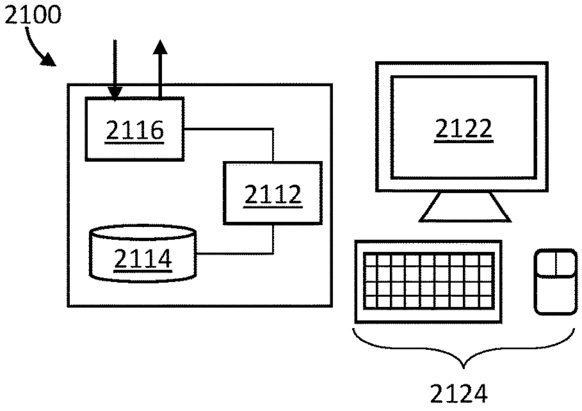
FIG. 21 is a schematic diagram illustrating an exemplary traffic analysis system.

FIG. 21 is a schematic view of an exemplary traffic analysis system 2100, which could be used in any of the implementations discussed herein. Traffic analysis system 2100 includes at least one processor 2112, at least one non-transitory processor readable medium 2114, and a communication interface 2116. The non-transitory processor-readable storage medium 2114 can have processor-readable instructions stored thereon which, when executed by the at least one processor 2112 cause the traffic analysis system to perform any of the operations or methods described herein (such as method 1100, method 1900, or any of the other operations for determining and tabulating journeys, for example). Communication interface 2116 can be a wired or wireless interface, through which data and inputs can be provided to traffic analysis system 2100, and through which data and outputs can be provided by traffic analysis system 2100. For example, location data for a plurality of vehicles can be received from a telematics system (such as telematics subsystem 102 in FIG. 1) by communication interface 2116, for processing and analysis by the at least one processor 2112. Resulting traffic analysis can also be output by communication interface 2116.

FIG. 21 also illustrates exemplary input and output devices through which a user or operator can interact with traffic analysis system 2100. In particular, FIG. 21 shows a display 2122, which can display outputs from traffic analysis system 2100 (like the maps shown in FIGS. 8 and 9, or the table shown in FIG. 10). Other output devices could be provided such as speakers, or any other appropriate output device. FIG. 21 also shows a keyboard and mouse 2124, which can be used to provide inputs to the traffic analysis system 2100, such as selection or indication of regions, or any other appropriate input. Other input devices could also be used, such as a touchscreen, microphone, trackpad, or any other appropriate input device. Although the input and output devices illustrated in FIG. 21 appear in the form of those used with a desktop computer, other forms of devices could also be used, such as portable devices like a laptop, smartphone, PDA, tablet, or any other appropriate device. Further, a device to which a user provides input and receives output can be remote from the traffic analysis system 2100. For example, the traffic analysis system including the at least one processor 2112, the at least one non-transitory processor-readable storage medium 2114, and the communication interface 2116 can be a server, which is remote from a workstation or device with which the user interacts.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to determine". Unless context dictates otherwise, such infinitive verb forms are used in an open and inclusive manner, such as "to at least operate" or "to at least determine".

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

What is claimed is:

1. A method comprising:

receiving an identification of a first geographic region;

receiving an identification of a second geographic region;

determining a number of vehicle journeys by a plurality of vehicles between the first geographic region and the second geographic region in at least a time interval, by:

receiving location data for the plurality of vehicles, the location data indicative of a succession of a plurality of trips travelled by each vehicle and indicative of at least one rest period of each vehicle wherein the respective vehicle is not moving, each trip in the plurality of trips being separated from a preceding trip by a respective rest period of the at least one rest period;

determining, for each vehicle in the plurality of vehicles, a number of journeys travelled between the first geographic region and the second geographic region by the vehicle, by:

comparing each rest period of the at least one rest period for the vehicle to journey criteria; and tabulating a number of journeys by the vehicle between the first geographic region and the second geographic region, where one journey includes one or more successive trips of the plurality of trips, each of the successive trips separated from each other by a respective rest period of the at least one rest period which satisfies the journey criteria, and the successive trips together representing travel between the first geographic region and the second geographic region;

generating traffic analysis results based on the determined number of journeys; and outputting the traffic analysis results to a user to provide the user with information regarding traffic patterns between the two regions.

2. The method of claim 1, wherein the first geographic region and the second geographic region are different.

3. The method of claim 1, wherein:

the first geographic region and the second geographic region are a common geographic region; and determining the number of vehicle journeys by the plurality of vehicles between the first geographic region and the second geographic region comprises determining the number of vehicle journeys which begin and end within the common geographic region.

4. The method of claim 1, further comprising receiving an identification of a third geographic region, wherein:

the first geographic region, the second geographic region, and the third geographic region are different; and successive trips together counted as a journey represent travel between the first geographic region and the second geographic region, through the third geographic region.

5. The method of claim 1, further comprising receiving an identification of a plurality of additional geographic regions, wherein:

the first geographic region, the second geographic region, and the plurality of additional geographic regions are different from each other; and successive trips together counted as a journey represent travel between the first geographic region and the second geographic region, through at least one of the plurality of additional geographic regions.

6. The method of claim 5, wherein successive trips together counted as a journey represent travel between the first geographic region and the second geographic region, through each of the plurality of additional geographic regions.

7. The method of claim 1, wherein determining the number of vehicle journeys by the plurality of vehicles between the first geographic region and the second geographic region comprises:

determining the number of vehicle journeys by the plurality of vehicles between the first geographic region and the second geographic region by summing together each respective tabulated number of journeys by each vehicle between the first geographic region and the second geographic region.

8. The method of claim 7, wherein:

the determined number of vehicle journeys by the plurality of vehicles between the first geographic region and the second geographic region is representative of a total number of vehicle journeys between the first geographic region and the second geographic region; and the method further comprises estimating the total number of vehicle journeys between the first geographic region and the second geographic region based on the determined number of vehicle journeys by the plurality of vehicles between the first geographic region and the second geographic region.

9. The method of claim 1, wherein:

receiving the identification of the first geographic region comprises receiving the identification of the first geographic region as an operator input; and receiving the identification of the second geographic region comprises receiving the identification of the second geographic region as another operator input.

10. The method of claim 1, wherein:

the first geographic region is identified as an origin for vehicle journeys;

the second geographic region is identified as a destination for vehicle journeys;

determining the number of vehicle journeys by the plurality of vehicles between the first geographic region and the second geographic region comprises: determining the number of vehicle journeys by the plurality of vehicles from the first geographic region to the second geographic region in at least a time interval.

11. The method of claim 1, wherein determining the number of vehicle journeys by the plurality of vehicles between the first geographic region and the second geographic region comprises:

determining the number of vehicle journeys as a combination of a first number of vehicle journeys by the plurality of vehicles from the first geographic region to the second geographic region and a second number of vehicle journeys by the plurality of vehicles from the second geographic region to the first geographic region.

* * * * *